United States Patent
Holohan et al.

(10) Patent No.: US 9,694,889 B2
(45) Date of Patent: Jul. 4, 2017

(54) METHODS AND SYSTEMS FOR A VERTICALLY VARIABLE OCEAN SAIL SYSTEM

(71) Applicant: Magnuss Services, Inc., New York, NY (US)

(72) Inventors: Eric Holohan, Mill Neck, NY (US); James Gibson Rhodes, New York, NY (US); Edward Anthony Shergalis, Greenwich, CT (US)

(73) Assignee: MAGNUSS SERVICES, INC., New York, NY (US)

( * ) Notice: Subject to any disclaimer, the term of this patent is extended or adjusted under 35 U.S.C. 154(b) by 0 days.

(21) Appl. No.: 15/061,583

(22) Filed: Mar. 4, 2016

(65) Prior Publication Data

US 2016/0257388 A1     Sep. 8, 2016

Related U.S. Application Data

(60) Provisional application No. 62/128,281, filed on Mar. 4, 2015.

(51) Int. Cl.
*B63H 9/02* (2006.01)
*B63H 21/20* (2006.01)

(52) U.S. Cl.
CPC ............ *B63H 9/02* (2013.01); *B63H 21/20* (2013.01); *Y02T 70/58* (2013.01)

(58) Field of Classification Search
CPC ...................................................... B63H 9/02
USPC ......................................................... 114/39.3
See application file for complete search history.

(56) References Cited

U.S. PATENT DOCUMENTS

| 1,674,169 A | * | 6/1928 | Flettner | B63H 9/02 |
| | | | | 415/3.1 |
| 2,713,392 A | * | 7/1955 | Von Karman | B63H 9/02 |
| | | | | 114/102.13 |
| 3,688,455 A | * | 9/1972 | Zebuhr | E04H 12/182 |
| | | | | 343/883 |
| 4,016,823 A | * | 4/1977 | Davis | B63B 15/0083 |
| | | | | 114/90 |

(Continued)

FOREIGN PATENT DOCUMENTS

| CN | 101920777 A | 12/2010 |
| EP | 0474363 A1 | 3/1992 |

(Continued)

OTHER PUBLICATIONS

Japanese Office Action dated Feb. 3, 2015 from Japanese Patent Application No. 2014-517208 along with unofficial English translation, 8 pp.

(Continued)

*Primary Examiner* — Lars A Olson
*Assistant Examiner* — Jovon Hayes
(74) *Attorney, Agent, or Firm* — Buckley, Maschoff & Talwalkar LLC (57) ABSTRACT

Mechanical systems and methods including, in some embodiments, a mounting plate affixed to an exterior facing horizontal planar deck surface of a ship; a foundation structure mounted to the mounting plate and supporting at least a first sail cylinder and a second sail cylinder; and at least a first lift mechanism for selectively vertically driving the first and second sail cylinders from a vertically retracted position to a vertically deployed position.

25 Claims, 5 Drawing Sheets

(56) References Cited

U.S. PATENT DOCUMENTS

| | | | | |
|---|---|---|---|---|
| 4,401,284 A * | 8/1983 | Austin | ............... | B63H 9/02 114/39.3 |
| 4,602,584 A * | 7/1986 | North | ............... | B63H 9/02 114/39.3 |
| 4,718,370 A * | 1/1988 | Portell-Vila | ............ | B63B 15/02 114/91 |
| 5,263,429 A * | 11/1993 | Brinkmann | ............ | B63H 9/0607 114/102.29 |
| 7,966,777 B2 * | 6/2011 | Douglas | ............... | E04H 12/182 52/110 |
| 8,261,681 B2 * | 9/2012 | Wobben | ............... | B63H 9/02 114/39.3 |
| 8,746,162 B2 * | 6/2014 | Holohan | ............... | B63H 9/02 114/102.29 |
| 2002/0139284 A1 * | 10/2002 | Iacoboni | ............ | B63B 15/0083 114/90 |
| 2009/0241820 A1 * | 10/2009 | Rohden | ............... | B63H 9/02 114/39.3 |
| 2011/0098601 A1 * | 4/2011 | Huynh | ............... | H01R 24/58 600/585 |
| 2011/0098605 A1 * | 4/2011 | deGreef | ............ | A61B 5/1036 600/592 |

FOREIGN PATENT DOCUMENTS

| | | | | |
|---|---|---|---|---|
| EP | 0511419 A1 | | 11/1992 | |
| GB | 2187154 A * | | 9/1987 | ............... B63H 9/02 |
| GB | EP 0474363 A1 * | | 3/1992 | ............... B63H 9/02 |
| JP | 02-296977 A | | 12/1990 | |
| JP | 08-260759 A | | 10/1996 | |
| JP | 2003-201774 A | | 7/2003 | |
| WO | 2011/098601 A1 | | 8/2011 | |
| WO | 2011/098605 A1 | | 8/2011 | |

OTHER PUBLICATIONS

"Korean Preliminary Rejection" dated May 5, 2015 from Korean Patent Application No. 10-2014-7001711, 3pgs.

"English-language Translation of Korean Preliminary Rejection" dated May 5, 2015 from Korean Patent Application No. 10-2014-7001711, 4pgs.

"Supplementary European Search Report", Dec. 8, 2015, European Patent Office, for European Application No. 12803144.0, 9pgs.

"Chinese Office Action and English-language Translation", dated Oct. 10, 2015, PRC Patent Office, for Chinese Application No. 201280041025.5, 10pgs.

"Philippines Substantive Examination Report" dated Apr. 28, 2015 issued by the Intellectual Property Office of the Philippines—Bureau of Patents from PH Patent Application No. 1/2013/502678, 2 pages.

"PCT Notification of Transmittal of the International Search Report and the Written Opinion of the International Searching Authority, or the Declaration", mailed Jan. 9, 2013, for International Application No. PCT/US2012/043746, 10pgs.

* cited by examiner

METHODS AND SYSTEMS FOR A VERTICALLY VARIABLE OCEAN SAIL SYSTEM

FIELD

Some embodiments relate to ship propulsion systems. More specifically, some embodiments provide sail systems to supplement ship propulsion systems.

BACKGROUND

The global shipping industry has reached a substantial tipping point in terms of energy consumption. Fuel costs currently consume 35% 80% of the industry's global revenue—the highest share of revenue in its history. The costs are steadily on the rise and show no signs of abating. It would be desirable to provide systems and methods to reduce these fuel costs, especially given fuel costs represent often more than two-thirds of a ship owner's/operator's annual expense.

Although shipping is a highly efficient means of transportation on a per ton/mile basis compared with other modes of transportation, ships are still major sources of pollution and CO2 emissions. Large commercial ships use bunker fuel, the tail end of the oil refining process that emits a cocktail of gases that harm both the planet and human health. Along with CO2, there are nitrogen oxides and sulfur oxides (the cause of acid rain) as well as what is known as particulate matter.

The global shipping trade is responsible for emitting a billion tons of CO2 a year, and as the global economy recovers this figure is bound to escalate. This means shipping, as a single industry, is a larger CO2 emitter than an entire industrialized country like Germany. If the shipping industry were a country it would rank number 6 in the world CO2 league table. It would be desirable to provide systems and methods to reduce these emissions.

DETAILED DESCRIPTION

Embodiments of the present invention provide systems, methods and apparatus that reduce energy consumption and emissions for ships. These reductions are made possible by retrofitting or otherwise installing one or more of a vertically-variable ocean sail system (interchangeably also referred to herein as "sail systems" or "VOSS") pursuant to the present invention. The disclosed sail systems include sail cylinders that are driven to spin and convert wind into forward thrust to aid ship propulsion.

Features of some embodiments of the subject vertically-variable ocean sail systems will be described herein, including some aspects of their installation and configuration on a vessel.

Figure 1:
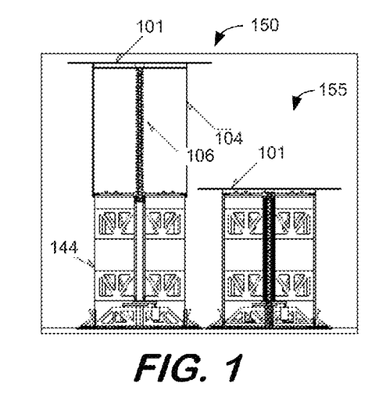
FIG. 1 is a view of a sail system, in accordance with some embodiments herein.

Reference is first made to FIG. 1 that is a view of a vertically-variable ocean sail system (VOSS), in accordance with some embodiments herein. In some aspects, sail system 100 is designed for ships where the space below the weather deck may be inaccessible, difficult to access, or otherwise unavailable to accommodate a sail system or portions thereof. For example, the space in some ships may be more valuable for carrying cargo than the fuel savings that may be gained by the use of the sail systems disclosed herein. In some regards, the sail systems disclosed herein may be well-suited (though not limited to) tanker ship applications and configurations. As such, sail system 100 may also be referred to as a T-VOSS system.

It is noted that while some embodiments disclosed herein are illustrated as being located on a deck of a ship, tanker, or other vessel, some embodiments could include at least part of a VOSS system located, at least in part, in a hold or lower area of the ship.

Sail system 100 does not retract or otherwise reside below a weather deck of the ship on which it is installed. Accordingly, the size of sail system 100 is not limited by the available space below deck for storage of the sail system or portions thereof. The size of the sail systems disclosed herein may instead depend on the deck space available and the size of the ship on which the sail system will be configured. For example, in some embodiments of the sails systems disclosed herein the size of the sail system may be on the order of about 10 meters in diameter with a corresponding deployment (i.e., fully extended) height of about 30 meters. In some configurations, a relationship of diameter to extended height may adhere to a 3:1, 6:1, 9:1 ratio. In some embodiments, other sizes, ratios, and relationships between a sail system's sail diameter and sail height may be observed, including other considerations and factors. In some aspects, when the height to diameter ratios of 3:1, 6:1, and 9:1 are maintained, the actual size of the unit can be tailored to the space on the vessel.

Figure 3:
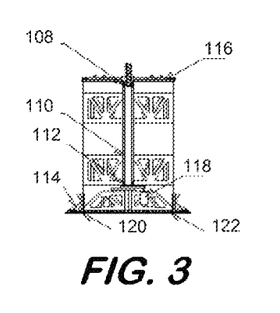
Figure 4:
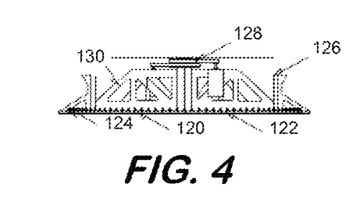

Sail system 100 includes an upper sail cylinder 104 and a lower sail cylinder 144, a central spindle 110 that supports upper bearings and lower bearings (shown in detailed view of FIG. 3), a lift screw 106 used to raise (i.e., deploy) and lower (i.e., retract) upper sail cylinder 104, rotational motors 118 (FIG. 3) that operate to drive the two sail cylinders with a drive belt 128 (FIG. 4). Sail system 100 further includes a top plate 101 at an upper terminal end of upper sail cylinder 104. FIG. 1 includes an illustration of sail system in a deployed configuration with the upper sail cylinder in a raised position at 150 and in a retracted configuration with the upper sail cylinder in a lowered position at 155.

Figure 2:
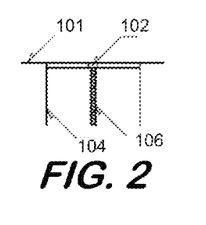
FIGS. 2-7 include detailed views of various aspects of a sail system, according to some embodiments herein.

Various aspects of sail system 100 will now be discussed with reference to the detailed views of FIGS. 2-7. In some aspects, FIGS. 2-7 refer to aspects of the sail system of FIG. 1, but they are not limited thereto. FIG. 2 includes a detailed view of an upper portion of some sail system embodiments. In particular, FIG. 2 shows details of top plate 101 and the relative configuration of lift screw fixing 102 and lift screw 106, and upper sail cylinder 104.

FIG. 3 illustrates some aspects of sail system 100, including a deck mounting plate 120, a receiver plate 122, and a ring bulwark 114 for anchoring and securing the sail system to the ship to which it is affixed. FIG. 2 further illustrates upper bearing 108, lower bearing 112, and central spindle 110, as well as shotpin mount 116 (explained below) and rotation motor(s) 118.

FIG. 4 illustrates some aspects of sail system 100, including a foundation structure 130. Foundation structure 130 is robust and strong structure/system. Foundation structure 130 supports central spindle 110 that is the axel about which the upper and lower sails are spun. FIG. 4 further illustrates deck mounting plate 120, receiving plate 122, and bolt attachment 124 for interfacing with receiver plate 122, and inner scupper wall 126 comprising the foundation structure. The rotational drive mechanism 128 is further shown in FIG. 4.

Foundation structure 130 comprises a two piece attachment system. Deck mounting plate 120 is fixed to the deck or other structure of the ship along with a scantling reinforcement prior to fitting with the sail system herein. Deck mounting plate may be fitted at any stage through the life of a ship, without a need or requirement to affix the sail system thereto. For example, a deck mounting plate herein may be affixed to a ship during an initial construction of a vessel or anytime thereafter, without a requirement of any other structural preparation work to accommodate one or more of the sail systems disclosed herein. In some regards, a sail system may be placed into position such that a receiver plate 122 of a sail system herein is matingly aligned with the deck mounting plate affixed to the ship's deck.

Referring again to FIG. 3, ring bulwark 114 is shown located on the receiver plate 122 of the sail system. Bulwark 114 is designed with a sloping lower section, in some aspects, to cut an onrush of green water over the deck, up to a height of, for example, about two meters. The slope of this structure is designed to dissipate the power of a wave and redirect it around the sail system(s) herein. In some embodiments, one or more drains and flapper valves (or other devices/mechanisms) may be included in or on the bulwark or other components to allow any water that reaches the inside of the bulwark to be drained out, without a possibility of the water re-entering via the same route.

In some aspects, lower sail cylinder 144 extends well below the height of the bulwark. This configuration may operate to allow rain and spray to flow down the sail cylinder and be routed between the bulwark and inner scupper wall ring 126, before being drained out onto, for example, the deck of the ship via a flapper valve.

Figure 7:
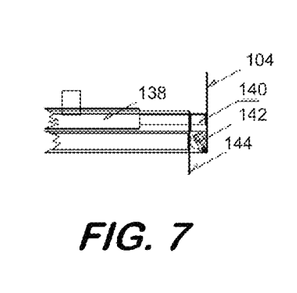

According to some aspects herein, upper sail cylinder 104 of sail system 100 is lifted and secured in place by shot pins 138 extending into a shot pin locking ring 140, as shown in FIG. 7. The shot pins are located on a top terminal end of the lower sail cylinder at shot pin mount 116 (as shown in FIG. 3). In some embodiments, other methods of securing sail comprising a sail system herein may be employed.

Figure 5:
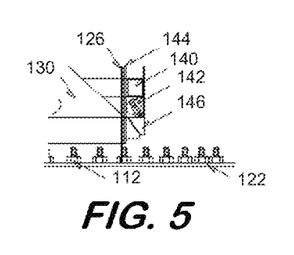

In some aspects per FIGS. 5 and 7, the upper sail cylinder 104 is positioned in the deployed configuration and in the retracted configuration by extending the shot pins 138 into two separate receiver rings. Operationally, when the sail system is retracted the shot pins extend and lock into the shot pin locking ring 120 to engage the lower portion of the upper sail cylinder 104 with mating wedge 146, as shown in FIG. 5. Mating wedge 146 has a counterpart on an exterior of the lower sail cylinder 144. Mating wedge rings 146 operate to ensure that the spacing between two sail(s) is consistently maintained and a load (e.g., wind, water, and a combination thereof) experienced by the upper sail cylinder can be passed directly through the mating wedge rings to central spindle 110 without distorting a symmetry of the upper sail.

Still referring to FIGS. 5 and 7, roller guides 142 are mounted to a lower edge of the upper sail cylinder(s) 104 and floating arms press the rollers against the outer surface of the lower sail cylinder(s) 142 in a constant manner. In this manner, the upper sail can be deployed symmetrically, without the lower receiver ring contacting the lower sail cylinder during deployment of the sail system and/or causing damage due to friction therewith.

Figure 6:
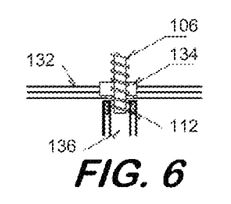

FIG. 6 illustrates some aspects of sail system 100. In particular, a configuration of lower bearing 112 and screw lift drive gearbox and motor 134 is shown relative central spindle 136 and shot pin deck 132. A portion of lift screw 106 is also shown being received in the hollow interior of central spindle 136.

Regarding the lifting mechanism for a sail system of some embodiments herein, the VOSS system is lifted by an internal mechanism. The lower sail cylinder can be rotated, but it does not move in a vertical direction. Referring to FIG. 6, gearbox and motor 134 and a large threaded nut are located on the shot pin deck 132. The large threaded nut retained on the shot pin deck 132 is turned on bearing 112. Operationally, as the nut is turned it engages with threaded lift screw 106 that is attached to the center of upper sail cylinder top plate 101. The attachment between the top plate 101 and lift screw 106 may not comprise any bearings since the top plate rotates with the sail cylinder when the sail system is deployed for operation.

In some aspects, the lift is provided from the top of the lower sail cylinder 144 by driving the threaded lift screw 106 upward from its retracted position inside of the hollow central spindle 136 (FIGS. 1 and 5). In this manner, lift is provided by the threaded lift screw, not from a base portion of the sail system.

In some embodiments, multiple screw drives and lift screws may be included in a sail system and operated simultaneously. The drives can be configured on an axial line of rotation or multiple drives can be located in a balanced fashion about/around the axial line of the sail system.

In some embodiments, the one or more lift mechanisms may be, in whole, in part, alone and/or in combination comprise systems and devices that include components that are hydraulic, pneumatic, an external or internal thread screw, a solenoid, a line and pulley, block and tackle, chain and sprocket, sprocket or cog and toothed rack, climbing rack, pinion and rack, and other mechanisms and systems to retract and/or extend embodiments of a sail system herein.

In some aspects, lifting devices of some embodiments of a sail system herein can be braked and depowered prior to beginning of a rotation of the system. In some embodiments, the lifting device(s) of a sail system embodiment herein will rotate entirely with the sail cylinders of the sail system. Although two sail cylinders are shown in FIGS. 1-7, some embodiments of the sail system herein may include additional sail cylinders, where the additional sail cylinders can be configured and deployed in a manner similar to that disclosed regarding system 100.

In some aspects, embodiments of sail systems herein may be operated in a retracted position in very high winds and/or other inclement weather conditions, as shown in FIG. 1 at 155. In some embodiments, a sail system herein may be operated in the retracted position when subjected to winds from about 5 knots to an unlimited force. In some aspects, the roll arm of a sail of a sail system herein is decreased by reducing the transactional area of the rotor in high winds. Additionally, a center of gravity of the sail system can be reduced when the sail(s) are retracted. In some aspects, wind cloaking may be achieved by rotating the sail system of some embodiments herein at or about the same speed as the wind velocity to eliminate windage effects on the rotors.

In some configurations, relatively larger diameter sails can be used to increase drive power provided to a ship including a sail system as disclosed herein, while reducing the rate at which a sail must be spun (e.g., rotations per minute, rpm) in order to achieve optimum (or a given) power output.

In some embodiments, a retracted sail system herein may operate in wind speeds up to about 100 knots. In other aspects, hardening of the structure is applicable to the retracted configuration of some embodiments after an operational range is maximized (e.g., between 5 and 40 knots).

Figure 8:
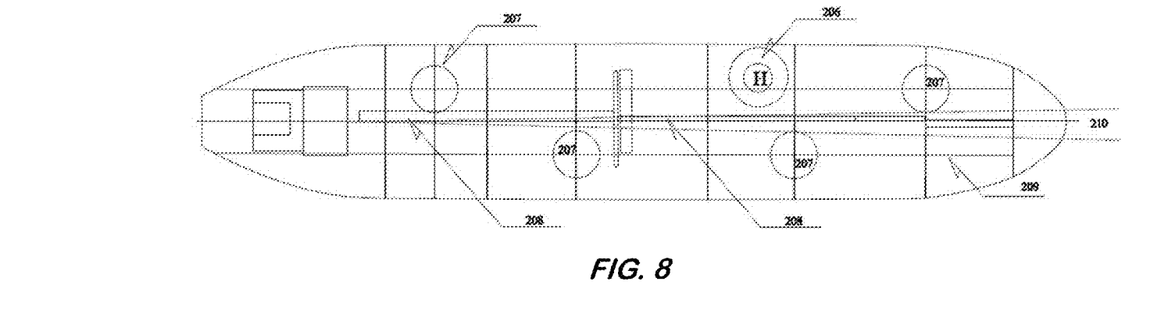
FIG. 8 is a view of a portion of a ship illustrating locations of some sail systems, in accord with some embodiments.

Regarding various design aspects, oil tankers and other vessels may have a variety of devices, components, and systems on the weather deck thereof. FIG. 8 is an exemplary depiction of a view of a weather deck 208 of an oil tanker. The ship deck of FIG. 8 includes pipes that can be used for, as an example, loading and discharge of oil. The pipes may typically be located on or near a center line of the ship, from the forward end of the deck house to the furthest forward cargo tank of the ship. Accordingly, the center line of such a ship may be restricted from use by other systems and devices.

Some very large crude carriers (VLCC) have a longitudinal bulkhead 209 located on the centerline as well as halfway between this longitudinal bulkhead and the side of the ship. In this manner, four tank spaces are created across the ship. In some respects, the ship's cargo area may be divided into smaller tanks that traverse bulkheads extending from one side to the other side of the ship. The locations 207 where the bulkheads intersect can provide a particularly strong attachment point for machinery and systems, without a need for additional reinforcement.

In some embodiments, sail systems herein may be mounted to a ship at locations 207. In some instances, placement of sail systems disclosed herein may consider a number of factors, such as but not limited to, locations reserved for other uses (e.g., helipad 206), load balancing and sail balancing to avoid (or reduce) a need to use rudder angle correction to adjust the ship's course for "sail steer" (e.g., weather helm or lee helm). In some instances, the shape of a ship's hull maybe considered in determining a center of the lateral resistance for reference when determining a location for positioning a VOSS herein. Since the sail systems are deployed off-center relative to the centerline, visibility forward on the centerline may be unobstructed for several degrees as depicted at 210.

Figure 9:
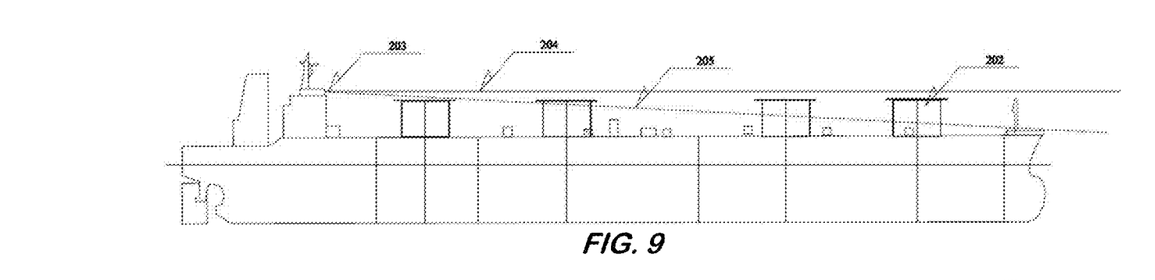
FIG. 9 is a side view of a portion of a ship with a retracted sail system, according to some embodiments.

FIG. 9 is an illustrative depiction of four sail systems according to some embodiments herein. The sail systems of FIG. 9 are shown configured to the deck of the ship in the retracted state. That is, the upper cylinder sail(s) are lowered. Being affixed to the weather deck, the sail system will be subjected to various weather conditions. The functionality to be retracted provides a measure of robustness to sail systems herein since a lower(ed) sail may better withstand harsh/extreme weather conditions. The sail systems herein may be retracted when wind conditions are high and/or to reduce drag. In some configurations, the fully deployed height for a sail system herein may be about 30 meters.

Figure 10:
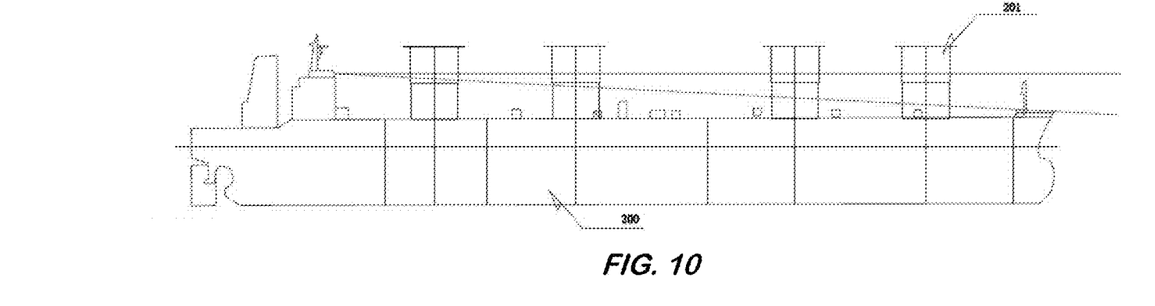
FIG. 10 is a side view of a portion of a ship with a deployed sail system, according to some embodiments.

In some instances, the height of some sail systems herein may be reduced by retracting the upper sail(s) to improve a visibility from a position on the ship. For example, visibility from the helm position on the bridge of a ship 200 may be improved when the overall height of the sail system is reduced below the height of the helm. As shown in FIG. 9, the horizontal sight line 205 is unobstructed from bridge 203 when the sail systems 202 are retracted. In FIG. 10, the horizontal sight line 205 from the bridge is obstructed when the sail systems 201 are deployed.

In some embodiments, a VOSS herein may include a multi-stage sail unit. FIGS. 11-15 are depictions of various aspects of a sail system including a multi-stage sail unit. The sail systems having a multi-stage sail unit are also referred to as a T-VOSS. Referring to FIGS. 11-15 collectively, the multiple sails of sail system 300 are arranged similar to the sails of sail system 100. In sail system 300, the largest diameter sail is the upper-most sail 302 when the sails thereof are deployed. The remaining sail cylinders have descending diameters corresponding to the successively lower levels. Accordingly, the upper portion of the deployed sail system 300 is largest at the top and smallest at the bottom (i.e., cone shaped). The top plate 101, central spindle 110, and deck bulwark 114 are similar to the similarly named aspects of sail system 100. Sail system 300 includes a bulwark 114 and a foundation structure 130, similar to sail system 100. Similar to sail system 100, sail system 300 is affixed to the deck of the ship with a plate to plate system, including deck mounting plate 120.

Figures 12, 13, 14, 15:
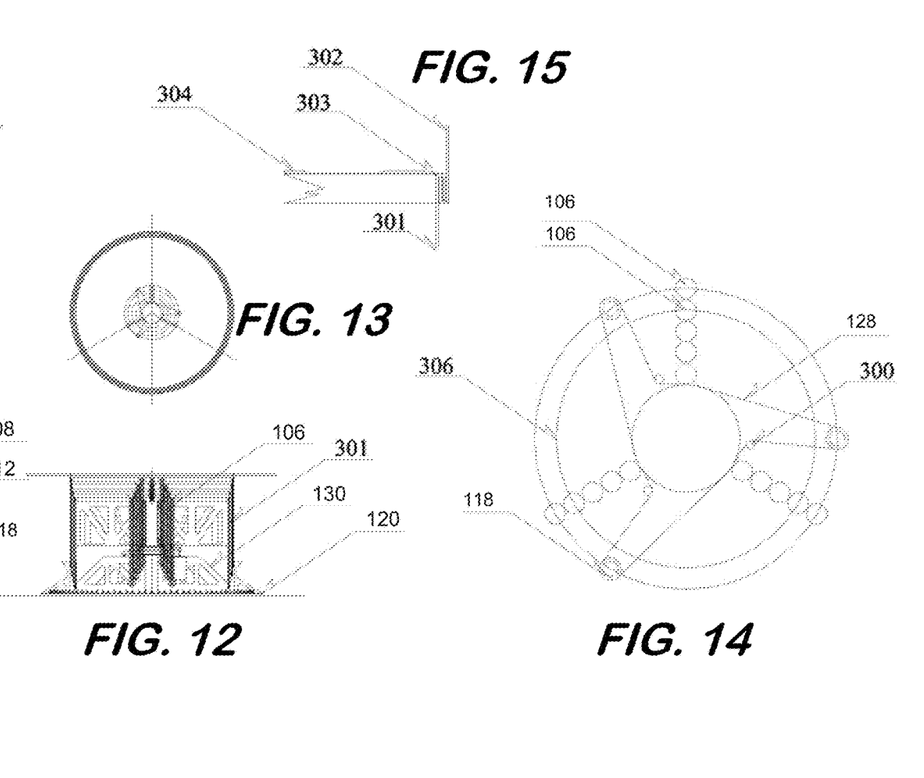
FIGS. 12-15 include detailed views of various aspects of a sail system, according to some embodiments herein.

Lifting of the sail cylinders of sail system 300 is provided by sets of lift screws 310, 312, and 314. As shown, the sets of lift screws are arranged evenly around a center point of each cylinder sail, as shown in FIGS. 13 and 14. In some embodiments, each set may comprise 2, 3 (as shown), 4, 5, or another predetermined number of lift screws. Operationally, the sets of lift screws may be driven vertically at a common, even rate to extend each sail cylinder in turn. In some aspects, the sequence is started with the lowest set first.

Figure 11:
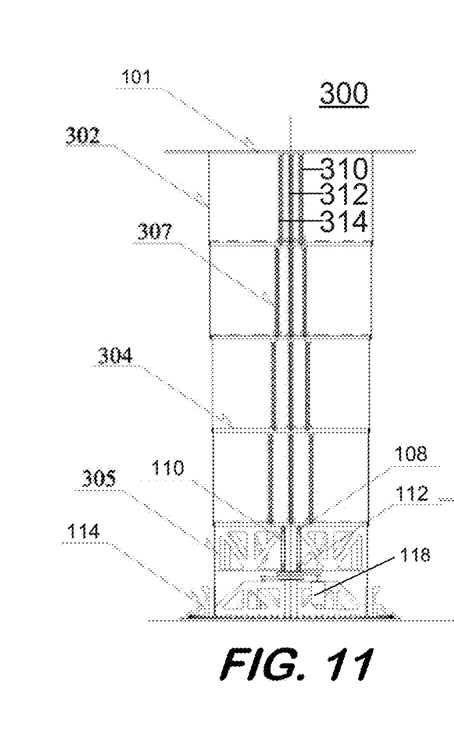
FIG. 11 is an illustration of another embodiment of a sail system, in accordance with some aspects herein.

FIG. 12 is a depiction of sail system 300 in the retracted configuration. The individual threaded lift screws pass through and into the sail cylinder below, as shown in FIGS. 11 and 12. The threaded screws that are in fixed attachment to an upper sail cylinder are retracted into the next lower cylinder when being retracted. In some aspects, the sets of lift screws 310, 312, and 314 are arranged evenly around the center of rotation of the sail cylinder so as to eliminate the generation of eccentric vibration.

In some aspects, each set of lift screws may be driven by as few motors as practicable or feasible, in some instances just one. In some embodiments, if there is one motor to drive three or more lift screw and they are interconnected by drive shafts such that each screw necessarily extends at an equal rate to the other screws, then an even (i.e., equal) lift may be achieved. In some embodiments, three of more pillars of equal length can provide a stable platform at, for example, 307.

In some embodiments, sail interlocking may be achieved by one or more techniques or mechanisms. Sail interlocking maybe achieved in some instances by the use of shot pins and by interlocking teeth in other embodiments where an upper-most sail section 302 has a gutter channel arranged about the base of the cylinder, as shown in FIG. 15. This gutter is configured to interface with a corresponding inverted gutter channel 303 located along an upper terminal end of lower sail section 301. When the two opposing channels mate and engage teeth (e.g., pin in hole or an interlocking constellation type such as that shown at 304), then the two gutters are fixed or locked relative to each other. Locked as such, there is not any relative rotational freedom between the two sail cylinders. The full vertical extension of the screws lifts may operate to ensure that the teeth are engaged under sufficient force to remain in the fixed, locked configuration throughout an operation of the sail system 300. When fully deployed, all of the sail cylinders and screw lifts (or other deployment mechanism(s)) will rotate as one unit.

Operationally, sail system 300 is spun about central spindle 110 in which bearings 108 and 112 are housed to permit the lowest cylinder to rotate. The lowest sail cylinder of sail system 300 is driven by electrical motors 118 with drive belts (not shown) attached to an extension 128 of the lowest sail.

In some embodiments, a sail system herein (e.g., T-VOSS) system 300 can rely, at least in part, on a compression of its deployed height to a relatively low profile, disc-like arrangement that is no higher than the height of the mounting plates, base support components, and the individual sail. Accordingly, the deployed height may be subdivided into more than two sail cylinders.

Referring to FIGS. 11-13, it is seen that each set of lift screws can be arranged in increasingly larger rotational circles about the rotational axis, from the top-most sail to the lowest sail. That is, the diameter of the circle on which the top-most screw lifts are configured is smaller than the diameter of the circle on which the lift screws for the next lower sail cylinder are attached. This aspect is shown in detail in FIGS. 12 and 14, where the lift screws for the top-most sail (and the other sails) are closer to the central axis, as compared to the next lower sail. In this manner, the illustrated configuration of FIGS. 11-15 is shown as providing a wide base of support with a tapering profile to the top of the multi-stage sail unit 300 when all lift screws are deployed.

Regarding some aspects of the sail systems disclosed herein, the sail cylinder design is selected to provide a sail cylinder diameter that achieves the optimal surface to wind-flow-velocity ratio, within the maximum designed rotational speed range. In one embodiment, the rotational speed of the sail cylinder is optimized for each wind speed up to 40 knots resulting in a maximum rotational speed of 200 rpm. In some embodiments, the ratio of surface velocity of the sail cylinders to the wind speed is used as an important factor to develop and sustain a pressure differential between the rear and the front of the sail system (e.g., 100, 300) that defines the thrust or drive vector.

Figure 16:
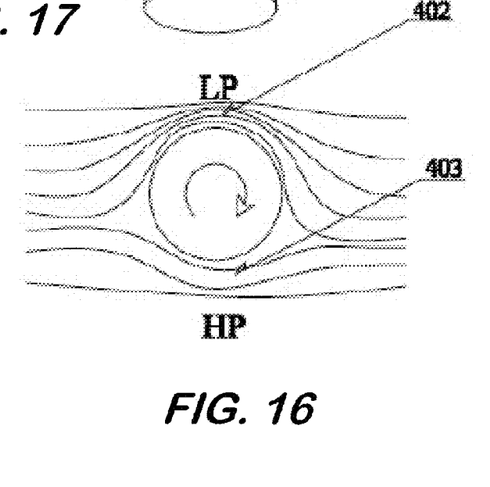
FIG. 16 is an illustrative depiction of airflow patterns relative to a sail system, in some embodiments.
Figure 17:
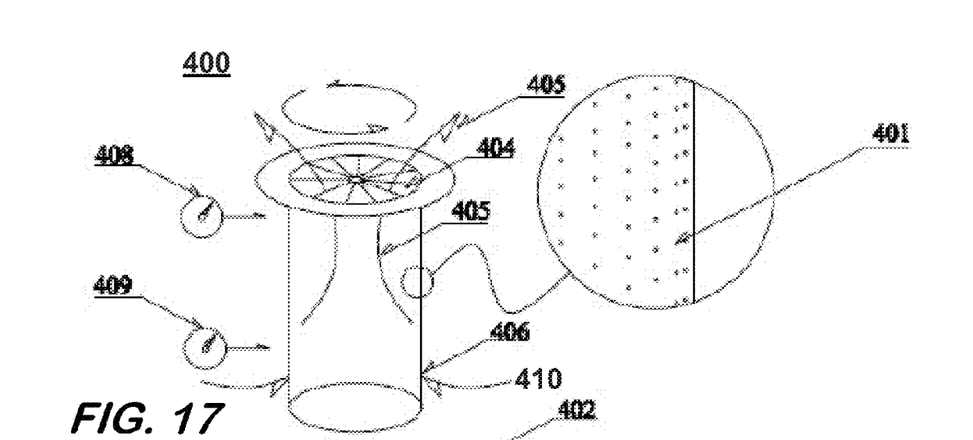
FIG. 17 is a depiction of a sail system including an airflow therethrough, according to some embodiments.

FIG. 16 is an illustrative depiction of airflow around a cylinder sail, in accordance with one embodiment herein. As illustrated, there is a difference in the air pressure at the different sectors of the sail, including a low pressure sector 402 and a high pressure sector 403. In an effort to increase the differential between the low (402) and high pressure (403) sectors of the VOSS sail when in use, Applicant has realized that a series of small perforations (401) can be placed at regular intervals (e.g., vertically and horizontally) as to cover a substantial portion of the sail's skin, as illustrated in FIG. 17. Different patterns of the perforations and the density thereof may be varied from that depicted in FIG. 17. In some embodiments, perforation size can be determined by analysis and by the application of vacuum gauges 408 at an upper-most vertical portion of sail 408 and a bottom-most vertical portion 409 of the sail. Greater diameter of the perforation holes will allow more air to pass at a smaller level of vacuum. In some aspects, the perforations and low internal air pressure of the VOSS combine to increase the retained boundary layer of wind and, hence, increase the Magnus effect of the VOSS allowing greater thrust to be generated In some embodiments, a set of fan type blades 404 will be installed in or on the top plate of the VOSS unit 400 to more efficiently eject air from the inside of the VOSS sails when the VOSS unit is spinning. This aspect of the sail system is depicted by the flow of air exiting the top of the sail from within the sail at 405. Blades 404 can be fixed and rotate in unison with the sail cylinder/s. Air expelled from the top of the VOSS unit can be replaced by air being sucked into the sail cylinder(s) through the perforations in the sail skin 401, as illustrated by the air flow shown at 406.

In some aspects, blades 404 will not be independently driven by a motor connected directly to the fan blades. Although the blades are fixed while the VOSS is in motion (i.e., spinning), the blades 404 may be configured by arrangement and/or design to expel air from the sail system when the sail cylinder is spun in either direction.

Figure 18:
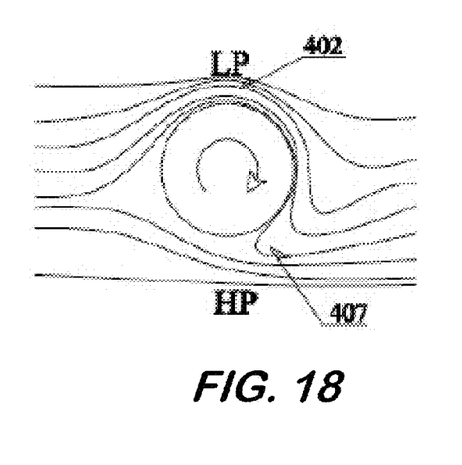
FIG. 18 is an illustrative depiction of airflow patterns relative to a sail system, in some embodiments.
Figure 19:
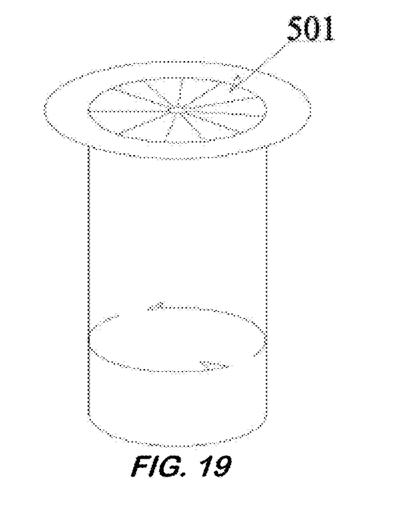
FIGS. 19-22 illustrate various aspects of a sail system to generate power, according to some embodiments herein.

The air flow depicted in sail system 400 will generate a more tightly held boundary layer of air at the surface of the VOSS, as shown in FIG. 18. The increased retention of the boundary layer of air will increase the amount of air having an increased velocity across the low pressure side of the sail cylinder at 402, while holding a greater amount to the VOSS as it returns in the direction of the wind flow at the high pressure sector of the sail at 407. In some instances, an effort may be made to have the two levels of experienced vacuum as close to each other for normal working revolution ranges of the sail system.

In some embodiments, in an effort to, for example, offset operational fuel costs when a ship is in port and must run her main engine or generators to produce electricity for onboard operations (e.g., running loading and unloading equipment, heating water for steam, house services such as water, AC, heating, lights and the ships power), some embodiments of sail systems herein may be configured to generate power.

Figure 20:
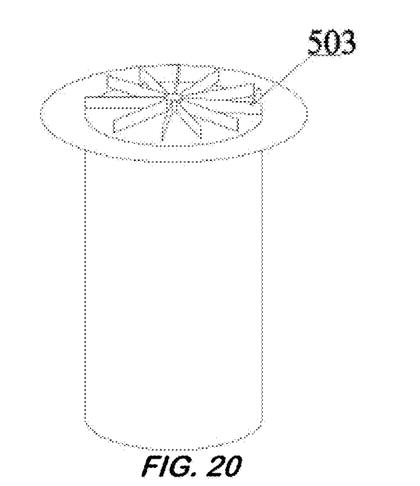
Figure 21:
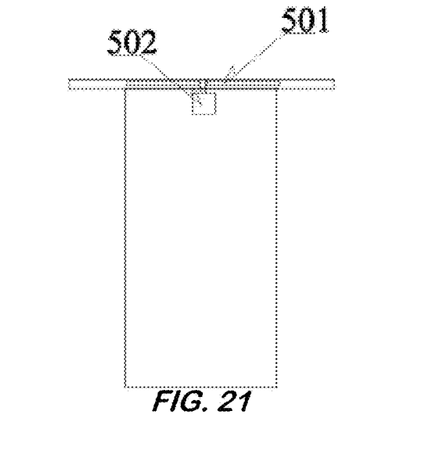
Figure 22:
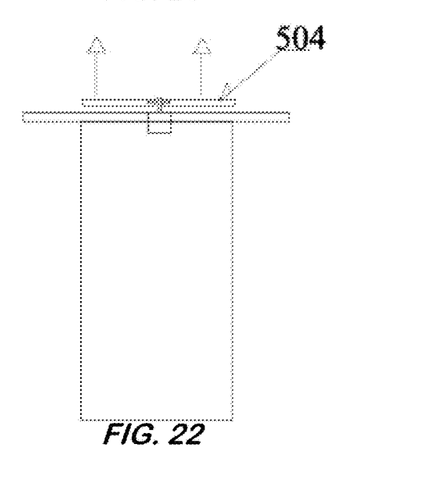

FIGS. 19-22 collectively illustrate various aspects related to power generation by a VOSS system herein. A top plate of a VOSS embodiment can have a set of turbine blades 501 inserted into or onto the top plate of the sail. The blades can be laid flat or arranged in some other configuration. In one embodiment, a generator or alternator 502 can be coupled to the blades 501, as illustrated in FIG. 21.

In some applications when a ship is in port and one or more of the VOSS systems disclosed herein are not producing propulsive power, the height and greater wind speed at the top of the deployed VOSS unit(s) may be leveraged by deploying a vertical axis wind turbine (VAWT) 503, as illustrated in FIG. 20. In some embodiments, the turbine blades 504 can be raised above the sail's top plate to be turned by the wind. It is noted that the VOSS will not be allowed to rotate freely during this operation. Power generated from the turbine of FIGS. 20-22 can be processed (e.g., filtered and otherwise regulated) and stored or fed back into the ships grid through a VOSS supply conduit. Power supplied in accordance with the system of FIGS. 19-22 and the methods related thereto can offset fuel oil burn or cost of connection to a shore power supply, in some embodiments.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A mechanical sail system, comprising:
   a mounting plate affixed to an exterior facing horizontal planar deck surface of a ship, the mounting plate residing on or above a weather deck of the ship;
   a foundation structure mounted to the mounting plate and supporting at least a first sail cylinder and a second sail cylinder, the first and second sail cylinders being positioned on or above the weather deck of the ship when in a vertically retracted position and a vertically deployed position;
   at least one drive motor to rotationally drive at least the first sail cylinder; and
   at least a first lift mechanism for selectively vertically driving the first and second sail cylinders from a vertically retracted position to a vertically deployed position, wherein at least the second sail cylinder is vertically lifted by the at least first lift mechanism from the retracted position to the deployed position that is vertically displaced from the retracted position.

2. The mechanical sail system of claim 1, wherein the exterior facing horizontal planar deck surface of a ship is on or above a weather deck of the ship.

3. The mechanical sail system of claim 1, wherein the at least first lift mechanism rotates with the sail cylinders when the sail system is deployed for operation.

4. The mechanical sail system of claim 1, wherein the first sail cylinder and the second sail cylinder comprise a multi-stage sail unit.

5. The mechanical sail system of claim 1, wherein the at least first lift mechanism is at least one of a device including a hydraulic device, a pneumatic device, an external or internal thread screw, a solenoid, a line and pulley, a block and tackle, a chain and sprocket, a sprocket and toothed rack, a climbing rack, a pinion and rack, and combinations thereof.

6. A mechanical sail system, comprising:
   a mounting plate affixed on top of an exterior facing horizontal planar deck surface of a ship;
   a foundation structure mounted to the mounting plate on the top of the exterior facing horizontal planar deck surface of the ship and supporting at least a first sail cylinder and a second sail cylinder, the at least first sail and second sail having a plurality of perforations disposed therein at regular intervals over a substantial portion of the at least first sail and second sail cylinders and being positioned on or above the weather deck of the ship when in a vertically retracted position and a vertically deployed position;
   at least one drive motor to rotationally drive at least the first sail cylinder; and
   at least a first lift mechanism for selectively vertically driving the first and second sail cylinders from a vertically retracted position to a vertically deployed position, wherein at least the second sail cylinder is vertically lifted by the at least first lift mechanism from the retracted position to the deployed position that is vertically displaced from the retracted position.

7. The mechanical sail system of claim 6, wherein each of the plurality of perforations comprises a throughhole.

8. The mechanical sail system of claim 6, wherein the plurality of perforations disposed in the at least first sail and second sail cylinders are substantially consistently spaced in both a vertical direction and a horizontal direction over the substantial portion of the at least first sail and second sail cylinders.

9. The mechanical sail system of claim 6, further comprising a set of fan type blades disposed on an upper terminal end of the second sail cylinder.

10. The mechanical sail system of claim 9, wherein the set of fan type blades is configured to aid in electing air from an interior space of the second sail cylinder when it is rotating.

11. The mechanical sail system of claim 9, wherein the set of fan type blades is disposed in fixed relation to the second sail cylinder and rotates in unison with the second sail cylinder.

12. The mechanical sail system of claim 9, wherein the set of fan type blades is fixed, independent of a motion of the second sail cylinder.

13. The mechanical sail system of claim 9, wherein the set of fan type blades is independently driven to rotate by a motor coupled thereto.

14. A mechanical sail system, comprising:
   a mounting plate affixed to an exterior facing horizontal planar deck surface of a ship;
   a foundation structure mounted to the mounting plate on the top of the exterior facing horizontal planar deck surface of the ship and supporting at least a first sail cylinder;
   at least one drive motor to rotationally drive at least the first sail cylinder.

15. The mechanical sail system of claim 14, wherein the at least a first lift mechanism rotates the first sail cylinder when the sail system is deployed for operation.

16. The mechanical sail system of claim 14, wherein the first sail cylinder comprises a multi-stage sail unit.

17. The mechanical sail system of claim 14, wherein the at least first lift mechanism is at least one of a device including a hydraulic device, a pneumatic device, an external or internal thread screw, a solenoid, a line and pulley, a block and tackle, a chain and sprocket, a sprocket and toothed rack, a climbing rack, a pinion and rack, and combinations thereof.

18. The mechanical sail system of claim 14, wherein the at least first sail cylinder includes a plurality of perforations disposed therein at regular intervals over a substantial portion of the at least first sail cylinder and being positioned on or above the weather deck of the ship.

19. The mechanical sail system of claim 18, wherein each of the plurality of perforations comprises a throughhole.

20. The mechanical sail system of claim 18, wherein the plurality of perforations disposed in the at least first sail cylinder are substantially consistently spaced in both a vertical direction and a horizontal direction over the substantial portion of the at least first sail cylinder.

21. The mechanical sail system of claim 14, further comprising a set of fan type blades disposed on an upper terminal end of the first sail cylinder.

22. The mechanical sail system of claim 21, wherein the set of fan type blades is configured to aid in ejecting air from an interior space of the second sail cylinder when it is rotating.

23. The mechanical sail system of claim 21, wherein the set of fan type blades is disposed in fixed relation to the first sail cylinder and rotates in unison with the first sail cylinder.

24. The mechanical sail system of claim 21, wherein the set of fan type blades is fixed, independent of a motion of the first sail cylinder.

25. The mechanical sail system of claim 21, wherein the set of fan type blades is independently driven to rotate by a motor coupled thereto.

* * * * *